United States Patent [19]

Frame et al.

[11] Patent Number: 5,287,463
[45] Date of Patent: Feb. 15, 1994

[54] METHOD AND APPARATUS FOR TRANSFERRING INFORMATION OVER A COMMON PARALLEL BUS USING A FIXED SEQUENCE OF BUS PHASE TRANSITIONS

[75] Inventors: Robert C. Frame, Westboro; Fernando A. Zayas, Stow, both of Mass.

[73] Assignee: Digital Equipment Corporation, Maynard, Mass.

[21] Appl. No.: 562,433

[22] Filed: Jul. 19, 1990

Related U.S. Application Data

[63] Continuation of Ser. No. 192,659, May 11, 1988, abandoned.

[51] Int. Cl.$^5$ .............................................. G06F 13/14
[52] U.S. Cl. .................................. 395/325; 364/240.8; 364/240.9; 364/240.1; 364/260; 364/DIG. 1
[58] Field of Search .................. 395/325, 725, 575; 340/825.5

[56] References Cited

U.S. PATENT DOCUMENTS

| | | | |
|---|---|---|---|
| 4,205,200 | 5/1980 | Parikh | 370/83 |
| 4,225,919 | 9/1980 | Kyu et al. | 370/83 |
| 4,354,229 | 10/1982 | Davis | 364/200 |
| 4,390,944 | 6/1983 | Quackenbush | 395/325 |
| 4,453,211 | 6/1984 | Askinazi | 395/500 |
| 4,574,362 | 3/1986 | Spindel | 364/900 |
| 4,590,468 | 5/1986 | Stieglitz | 364/200 |
| 4,688,168 | 8/1987 | Gudaitis | 364/200 |
| 4,715,045 | 12/1987 | Lewis et al. | 370/82 |
| 4,716,525 | 12/1987 | Gilanyi | 364/200 |
| 4,766,536 | 8/1988 | Wilson | 395/325 |
| 4,769,818 | 9/1988 | Mortimer | 371/37 |
| 4,783,705 | 11/1988 | Moon | 364/200 |
| 4,821,170 | 4/1989 | Bernick | 364/200 |
| 4,839,793 | 6/1989 | Brunk | 364/200 |
| 4,864,291 | 9/1989 | Korpi | 364/900 |
| 4,864,532 | 9/1989 | Reeve | 364/900 |
| 4,908,749 | 3/1990 | Marshall | 395/325 |

OTHER PUBLICATIONS

Small Computer System Interface (SCSI), American National Standard, ANSI X3.131 (1986).
Devin, Phil, Wescon Proceedings San Francisco, Calif., "The Migration from SASI to SCSI a new generation" Nov. 19-22, 1985; pp. 1-5.
G. Humpfrey et al., Electronic and Wireless World, vol. 95, No. 1643, "SCSI—Small Computer System Interface", Sep. 1989; pp. 884-888.

*Primary Examiner*—Eric Coleman
*Attorney, Agent, or Firm*—Kenyon & Kenyon

[57] ABSTRACT

An atomic ordered sequence of information phase transitions allows for the design of a pure hardware protocol controller for use in a small storage interconnect bus. The information phase transitions follow the sequence: Command Out phase, Data Out phase, and Status In phase. The only other transition sequence allowed is from the Command Out phase directly to the Status In phase. The Command Out phase is actually a header delivering header information. Included in the header are a REQ/ACK offset byte, source destination ID verify byte, frame length bytes, and a checksum byte. The Data Out phase contains any number of bytes that were defined in the Command Out frame length byte. The Status In phase is a single byte which is used to signal the outcome of the attempted data delivery.

120 Claims, 11 Drawing Sheets

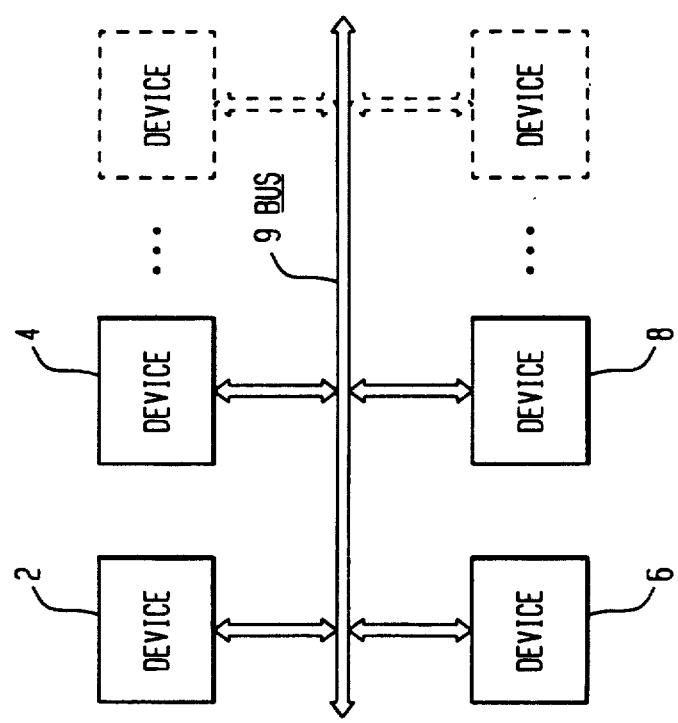

FIG. 5A

| MODE | BRANCH CONDITIONS | | | | |
|---|---|---|---|---|---|
| | DODMA | SKIPDMA | DOIDLE | DO DEASSERT | DOBYTE |
| TARGET SEND STATUS | 0 | BRANCH | 0 | 0 | 0 |
| TARGET RECEIVE COMM/DATA | BRANCH | 0 | DONE*IPE+ DONE*ERR | DONE*-IPE* -ERR* -MISMATCH | BRANCH |
| INITIATOR RECEIVE STATUS | 0 | BRANCH | 0 | 0 | 0 |
| INITIATOR SEND COMM/DATA | BRANCH | 0 | MISMATCH* DONE | -MISMATCH* DONE | BRANCH |

METHOD AND APPARATUS FOR TRANSFERRING INFORMATION OVER A COMMON PARALLEL BUS USING A FIXED SEQUENCE OF BUS PHASE TRANSITIONS

This application is a continuation of application Ser. No. 192,659, filed May 11, 1988, now abandoned.

FIELD OF THE INVENTION

This invention relates to a bus for use in a computer system and, more particularly, to a small computer storage interconnect and pure hardware protocol controller having an atomic, ordered sequence of information phase transitions.

BACKGROUND OF THE INVENTION

The present invention improves upon the industry standard Small Computer System Interface (SCSI), which is hereby incorporated by reference.

The SCSI interconnect was developed as a result of the proliferation of inexpensive VLSI device controllers which changed the economics of interfaces for small system storage devices. The inexpensive VLSI device controllers allowed a controller to be built in each device.

Also, because device interfaces are very specific to certain device types, many device level interface standards would have been required to service all small computer device types. As a result, having to connect every backplane bus to every device interface through a controller would require an almost unbounded number of specific controller products. The development of the SCSI standard allowed a single computer backplane slot to service a varity of devices.

In view of the above problems, a small system parallel bus was developed which generally met the small system requirements for a device-independent peripheral or system bus. The small computer system interface bus enjoyed significant market success and eventually became the industry standard SCSI.

The SCSI interface is a local input/output (I/O) bus that can be operated at data rates in excess of five megabytes per second depending upon the circuit implementation. The primary objective of the interface is to provide host computers with device independence within a class of devices. The interface protocol includes provisions for the connection of multiple initiators, i.e. devices capable of initiating an operation, and multiple targets, i.e. devices capable of responding to a request to perform an operation.

The SCSI architecture includes eight distinct bus phases: BUS FREE, ARBITRATION, SELECTION, RESELECTION, COMMAND, DATA, STATUS, and MESSAGE. The last four phases, COMMAND, DATA, STATUS and MESSAGE, are the information transfer phases as they are all used to transfer data or control information via the data bus. The SCSI standard provides Command/Data (C/D), Input/Output (I/O), and Message (MSG) signals to distinguish between the different information transfer phases. The target device drives the three signals and therefore controls all changes from one phase to another. Included within the Data phase and Message phases are the DATA IN, DATA OUT, and MSG IN, MSG OUT sub-phases respectively.

The SCSI standard places no restrictions on the sequences between the information transfer phases. As a result of not placing restrictions on the information phase transitions that can occur between phases during any transfer, i.e. Command Out, Data Out, Data In, Status, MSG Out, and MSG In, the number of interconnections which must be made are so numerous as to require software assistance for proper operation. A problem arises with software assistance in that it incurs software latency in servicing the changes in the bus conditions.

Further, the information transfer phases used in the SCSI bus require one or more request/acknowledge (REQ/ACK) handshakes between the initiator and target to control the information transfer. Each REQ/ACK handshake allows for the transfer of one byte of information. A synchronous data transfer using the SCSI bus must be previously agreed to by the initiator and target through an exchange of messages. The messages determine the use of the synchronous transfer mode by both SCSI devices and establish a REQ/ACK offset and a transfer period.

The REQ/ACK offset specifies the maximum number of REQ pulses that can be sent by the target in advance of the number of ACK pulses received from the initiator, thus establishing a pacing mechanism. The determination of the REQ/ACK offset in SCSI requires a negotiation between the target and initiator. A microprocessor is used to set up this value for each transfer. However, the negotiation of the REQ/ACK offset and the need to maintain the negotiated values can slow down the synchronous data transfer.

In order to check the integrity of the SCSI bus, the SCSI system uses byte parity as its sole mechanism for detecting data errors. The use of only a single error detecting mechanism presents problems for the proper validation of data.

Other known bus interconnects provide a fixed sequence of phase transitions, thus simplifying the protocol of the controller. Further, because some of these prior buses use a coaxial cable, the fixed sequences are so rigid that in the case of an error developing in one of the phases, the sequence must continue through the other phases before returning an invalid signal. Thus, if an error were to initially be detected in the command phase, the system must wait for the transitions through the data and status phases before returning an invalid or no acknowledgment (NAK) signal. This consumes more time and slows down the system.

SUMMARY OF THE INVENTION

The problems associated with the prior bus interconnects are overcome in the present invention through the use of an atomic, ordered sequence of information phase transitions. The atomic nature of the sequence treats the information transfer phases as a single operation. The ordered sequence allows for the design of a pure hardware protocol controller for use in a digital small storage interconnect bus.

The ordered sequence of bus phase transitions is implemented at the data link layer of the interface, i.e. the second lowest level protocol, above the physical layer and below the port layer. The sequence of bus phase transitions allows the passage of information frames between one node and another at the data link layer. Further, the sequence of bus phase transitions between one node and another operates as a single atomic operation. In a normal, vertical path of bus phase transitions returning to an initial bus free phase, three pieces of information are exchanged between nodes using the Command, Data, and Status phases. Those phases are defined as the information phase transitions and follow the following sequence: Command Out phase, Data Out phase, and Status In phase.

Communication on the bus is limited to two devices at a time. Each device or node is assigned an identification (ID) bit corresponding to its ID number. When two devices or nodes communicate on the bus, one acts as the initiator, the other as the target. The initiator starts the operation by arbitrating for control of the bus and selecting the target. The target then requests the data from the initiator. All devices are required to be capable of acting as both target and initiator.

The Command Out, Data Out, and Status In phases are grouped together as the information transfer phases forming the atomic ordered sequence. The C/D and I/O signals are used to distinguish between these phases. The target drives the C/D and I/O signals and therefore can switch from one phase to another when desired. The following table shows the state of the C/D and I/O bits for the available phases.

| C/D | I/O | Phase Name | Comment |
| --- | --- | --- | --- |
| 0 | 0 | DATA OUT | data sent to target |
| 0 | 1 | ** | phase is not defined |
| 1 | 0 | COMMAND OUT | command sent to target |
| 1 | 1 | STATUS IN | status returned to initiator |

Several of the signals used on the bus are described below:

C/D (command/data)—when asserted low, this signal indicates that control information is on the data bus. A false signal indicates data information is being transferred.

I/O (input/output)—when asserted low, this signal indicates that the data movement is toward the initiator. A false signal indicates data movement toward the target.

REQ (request)—when asserted low, this signal indicates a target's desire to begin a REQ/ACK handshake.

ACK (acknowledge)—when asserted low, this signal indicates an initiator's acknowledgment for a REQ/ACK handshake.

Information is transferred using one or more REQ/ACK handshakes. Each handshake allows the transfer of a single byte. Two types of transfers are used in the atomic sequence: asynchronous and synchronous.

Asynchronous transfers are used to send the command phase or header bytes to the target as well as to return the status to the initiator. No actual commands, e.g. WRITE, READ, etc. are delivered in the command phase bytes. Rather, the commands are delivered in the Data Out phase which is a synchronous transfer.

Synchronous transfers are used to send data information, e.g., commands and data, to the target. The initiator specifies a REQ/ACK offset parameter in the Command Out phase. This parameter defines the maximum number of REQ pulses that can be sent by a target in advance of the ACK pulses it receives from the initiator. Whenever the outstanding REQ pulses equals the REQ/ACK offset parameter, the target must wait until the next ACK pulse is received before asserting REQ.

A synchronous transfer is considered successfully completed when the number of ACK pulses equals the number of REQ pulses and the number of bytes transferred during the data phase is equal to the transfer length specified in the Command Out phase.

The atomic ordered sequence is made possible by using a bus including eight data bits and two status or phase bits. The two status or phase bits are a command/data (C/D) bit and an input/output (I/O) bit. The order of the atomic sequence is Command Out phase for a set number of bytes, Data Out phase for a specified number of bytes and Status In phase for one byte. The only other transition sequence allowed is from the Command Out phase directly to the Status In phase. Use of the atomic ordered sequence greatly simplifies the number of possible states and phase transitions thus making it easier to implement in hardware.

The interface and protocol controller of the present invention improves upon prior known devices by implementing the bus controller entirely in hardware without software assistance. This improves the performance on the bus as there is no software latency in servicing changes in the bus conditions. Further, it also improves the performance of the devices on the bus since the local intelligence of the bus devices does not have to service the controller interface in real-time.

The Command Out phase is actually a header delivering seven bytes of information. Included in the header are a REQ/ACK offset byte, source and destination ID verify bytes, frame length bytes and a checksum byte.

In the Command Out phase, the initiator delivers control information to the target in preparation for the Data Out phase. The target will assert C/D and negate the I/O signal during the REQ/ACK handshakes of the Command Out phase.

The Data Out phase may contain any number of bytes that were defined in the Command Out frame length bytes. In the Data Out phase, the initiator delivers data to the target. The delivery of the data is accomplished using synchronous data transfers. The target will deassert C/D and I/O during the REQ/ACK handshakes of the Data Out phase.

The Status In phase is a single byte which is used to tell the initiator the outcome of the attempted data delivery. Only two Status In byte values are used as only two outcomes are possible acknowledged (ACK) or no acknowledgment (NAK). In the Status In phase, the target returns the status to the initiator informing it as to whether it received the information without a transmission error. The target will assert C/D and I/O during the REQ/ACK handshake. Each of the above phases has a specific format for the information transferred.

It is an advantage of the present invention to provide a header check to ensure that the initiator properly selected the desired device or target. The header check operates by sending, during the Command Out phase, both the initiator's ID and that of the target it wished to select. The selected target device then verifies that these transmitted values match those it expected. If for some reason the header check is incorrect, then the fixed sequence jumps directly from the Command Out phase to the Status In phase where a NAK signal will be returned. The header check provides an additional check in order to ensure data integrity.

It is a further advantage of the present invention to eliminate the need to negotiate a REQ/ACK offset as is done in the prior SCSI standard. This is made possible in the present invention because all of the synchronous data transfers are done from the initiator to the target. Therefore, the REQ/ACK offset to be used in the atomic sequence transfer can be supplied in the Command Out phase bytes passed from the initiator to the target. The value reflects the maximum offset that the initiator is willing to accept, i.e., a measure of the size of its REQ counter. The target uses the minimum of the REQ/ACK Therefore, no "negotiation" occurs between the initiator and the target and no state is maintained between the two nodes on the bus. This further eliminates the need for the microprocessor to set up the REQ/ACK offset value for each transfer, as the value is determined in the hardware protocol controller.

Further, there is provided frame length bytes in the Command Out phase which allows the entire digital small system interconnect protocol to be handled in hardware. The frame length byte provides the target or receiving node with the length of the data in bytes which will be transferred in the Data Out phase.

It is yet another advantage to provide checksums for both the Command Out and Data Out phases. The use of a checksum at the end of the Command Out and Data Out phases improves the integrity of the bus by providing an additional mechanism for detecting errors.

These and other advantages will be realized by the device of the present invention as explained in detail below.

DESCRIPTION OF THE DRAWINGS

FIG. 1 is a system block diagram of the devices coupled to the bus of the present invention.

FIG. 5A is a table for the branch conditions of FIG. 5.

DETAILED DESCRIPTION

Referring to FIG. 1, there is shown a system block diagram of the bus 9 of the present invention coupled to several devices 2 through 8. Although four devices are illustrated as coupled to the bus 9 in this exemplary embodiment, a different number of devices can be coupled to the bus 9 without departing from the scope of the invention. These devices can be central processing units, peripheral memory storage units, etc. Each of the devices 2 through 8 has the capability of being either an initiator or a target device during the information transfer phases. Data is communicated between the devices during information transfer phases.

Figure 1A:
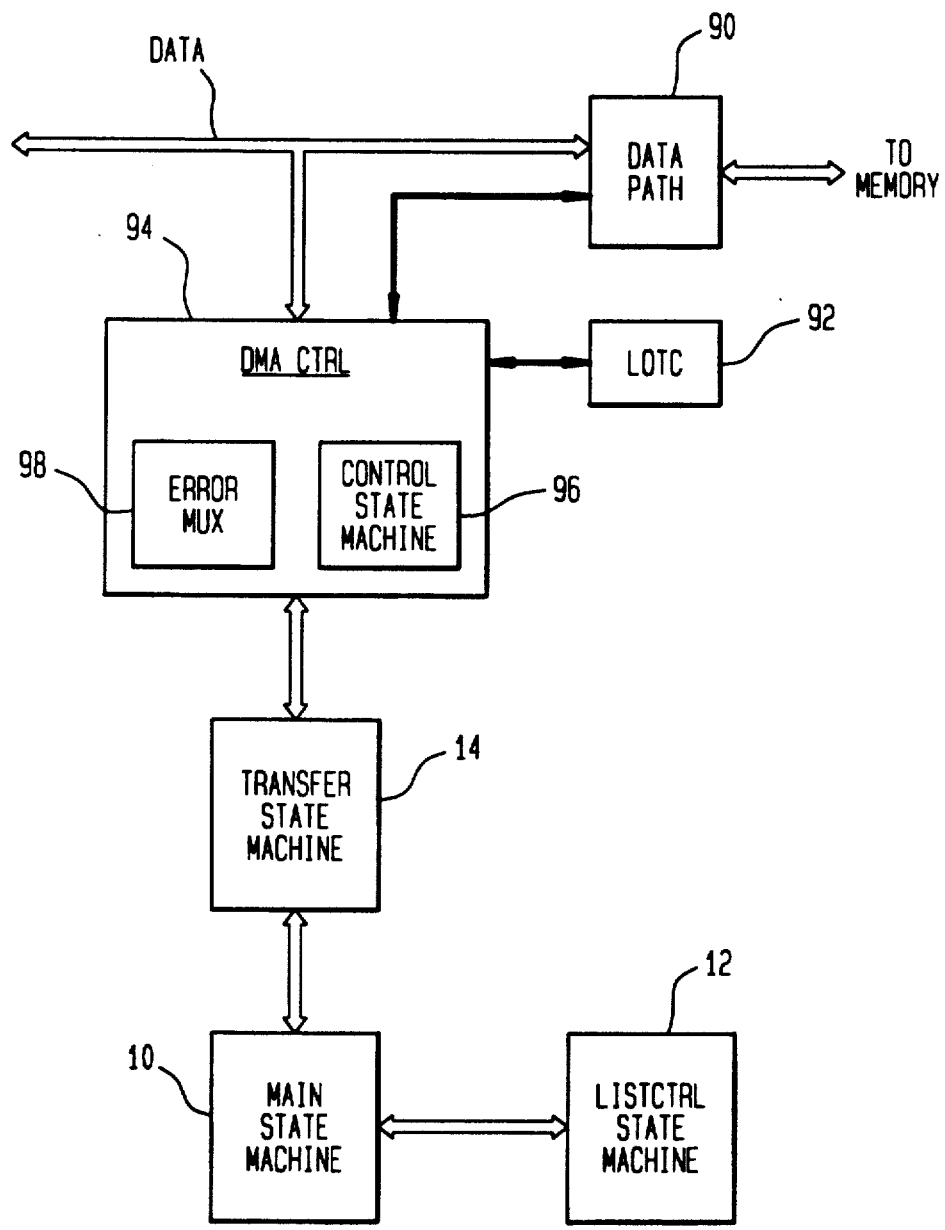
FIG. 1A is a block diagram of the state machines of the present invention.

Referring to FIG. 1A, there is shown a block diagram of the state machines of the present invention. The operation and interconnection among the state machines are fully described below in reference to the individual operation of the state machines.

Figure 1B:
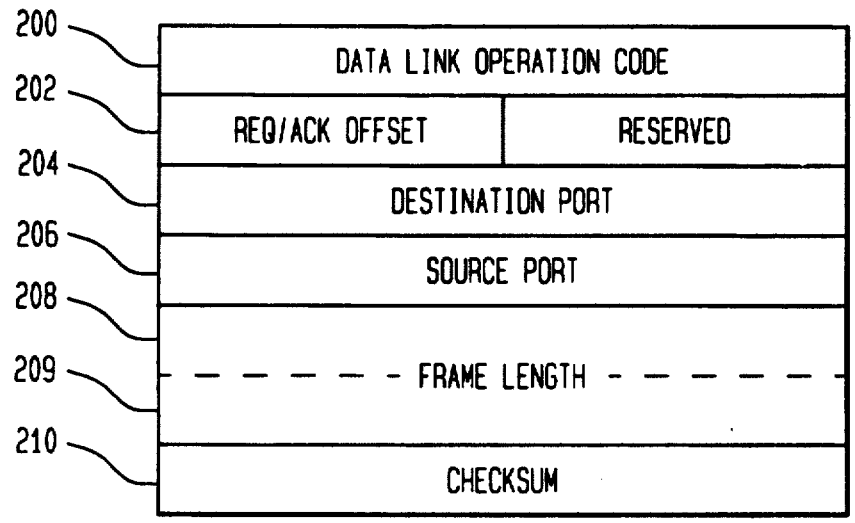
FIG. 1B is a block format of the command out phase of the present invention.

Referring to FIG. 1B, there is shown the Command Out format used in the atomic operation to deliver information. The Command Out format is seven bytes in length containing a data link operation code byte 200, a REQ/ACK offset byte 202, a destination port byte 204, a source port byte 206, frame length bytes 208 and 209, and a checksum byte 210.

The data link operation code contains the opcode for the data link layer. The REQ/ACK offset value 202 contains the maximum REQ/ACK offset to be used in the particular communication. This number is determined by the size of the target's FIFO buffer and the size of the counter used by the initiator. The value actually reflects the maximum offset that the initiator is willing to accept, i.e., a measure of the size of its REQ counter. Therefore, the REQ/ACK offset value 202 has a value exactly equal to the initiator's maximum REQ/ACK offset. The target device will then use the minimum of either the REQ/ACK offset byte 202 value or the actual size of its FIFO buffer. In this manner, no "negotiation" occurs and no state is maintained between the two nodes on the bus.

The destination port byte 204 is the bus ID for the node receiving the information, i.e., the target. Further, the source port byte 206 is the bus ID for the node transmitting the information, i.e., the initiator. The frame length bytes 208, 209 are the length, in bytes, of the data that will follow the Command Out phase in the Data Out phase. This value excludes the checksum byte 222 which is the last byte in the Data Out phase. The Command Out phase ends with a checksum byte 210.

Figure 1C:
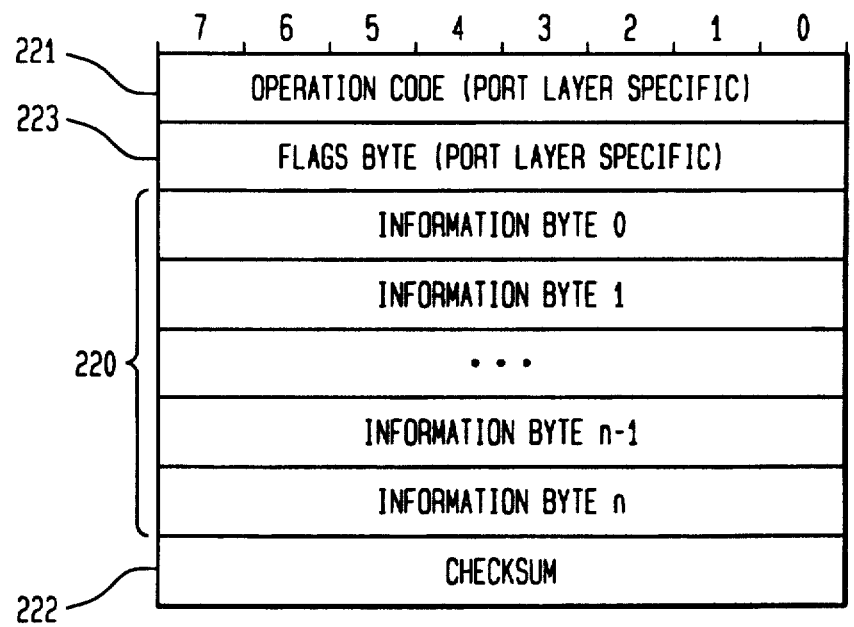
FIG. 1C is a block format of the data out phase of the present invention.

The format for the Data Out phase is shown in FIG. 1C and contains an operation code byte 221, a flag byte 223, and the number of information bytes 220 specified by the frame length bytes 208, 209 of the Command Out phase. Further, the Data Out phase ends with a checksum 222 byte.

The Status In phase is a single byte used to tell the initiator the outcome of the attempted data delivery. Only two of the status byte values are used by the data link layer as only two outcome are possible: ACK or NAK. ACK is defined as the positive acknowledgment of a previous Command Out/Data Out information phase. NAK is defined as the negative acknowledgment of a previous Command Out/Data Out information phase.

Figure 2:
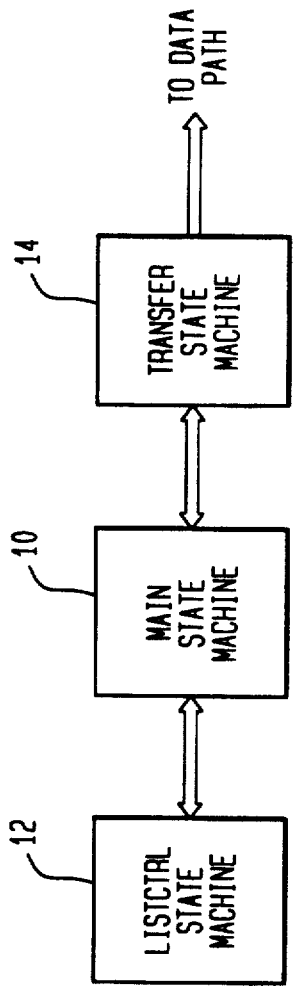
FIG. 2 is a block diagram of the state machines used in the present invention.

Referring now to FIG. 2, there is shown in block diagram form the state machines which operate the information phase transitions of the present invention. Each device on the bus has an interface containing all of the state machines described in the figures. A main state machine 10 is coupled to both a transfer state machine 14 and a list control state machine 12. The main state machine 10 operates both the list control state machine and the transfer state machine 14. Further, the transfer state machine 14 controls the transfer of data through a data path (see FIG. 1A).

Figure 3:
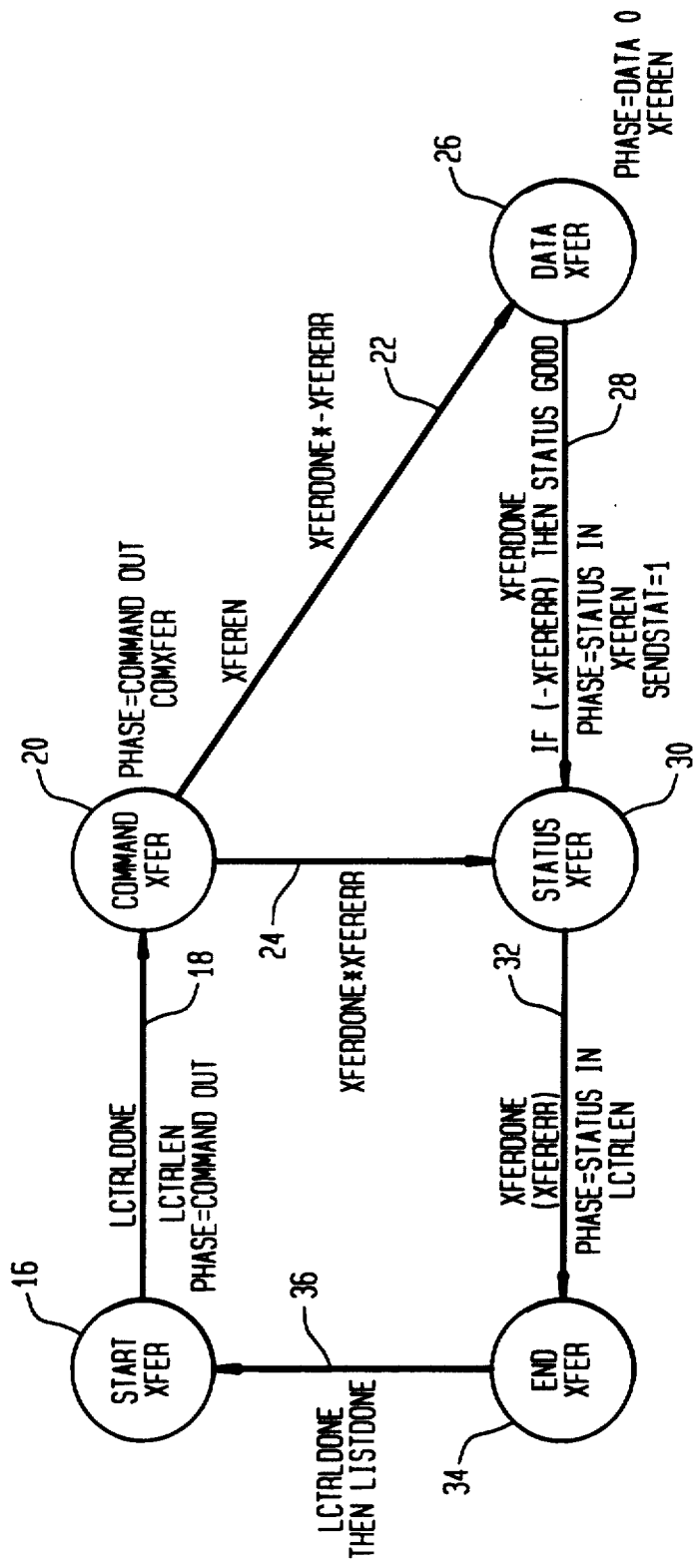
FIG. 3 is a state diagram for the main state machine of FIG. 2.

A sequence of bus phase transitions is needed at the data link layer for the passage of information frames between one node and another on the bus. FIG. 3 is a state diagram for the main state machine 10 showing the allowed sequence of information phase transitions. The sequence of information phase transitions between one node and another operates as a single atomic operation.

The state diagram for the main state machine begins in a start transfer state 16. The start transfer state 16 changes to a command transfer state 20 as shown by arrow 18. The command transfer state 20 branches as shown by arrows 22 and 24 depending upon the results of the command transfer. A transfer completed without error causes the transition of the bus phase to the data transfer state 26. However, a transfer completed with an error changes the state of the machine directly to the status transfer state 30.

Assuming there is no error in the command transfer, the data transfer state 26 would begin. Upon completion of the data transfer, with or without an error, the bus phase changes to the status transfer state 30 as shown by arrow 28. Once the main state machine completes the status transfer state 30, arrow 32 leads to the end transfer state 34. The end transfer state 34 returns the state diagram to the original start transfer state of the machine 16 as shown by arrow 36. The fixed atomic sequence between command transfer state 20, data transfer state 26 and the status transfer state 30 defines the atomic sequence for the information phase transitions on the data link layer.

Figure 4:
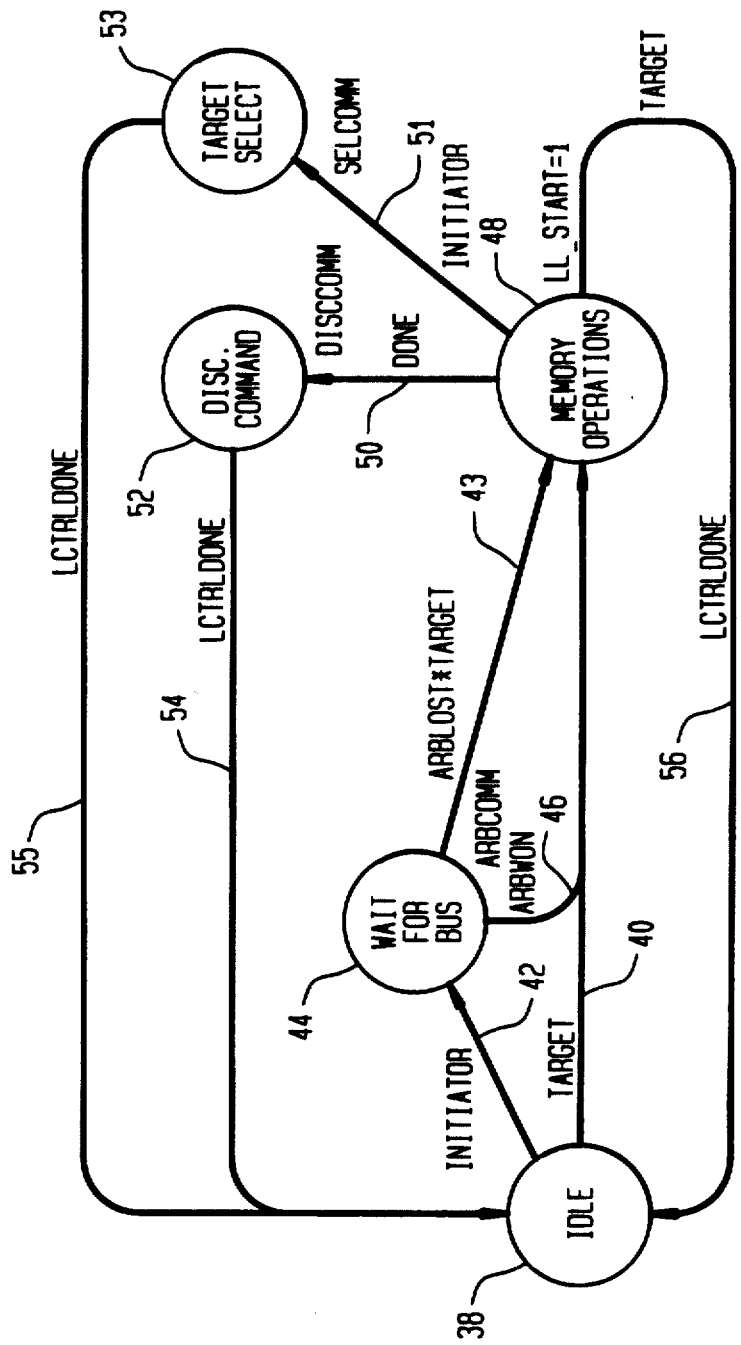
FIG. 4 is a state diagram for the list control state machine of FIG. 2.

Referring to FIG. 4, there is shown the state diagram for the list control state machine 12 shown in FIG. 2. The list control state machine 12 is enabled at the beginning of a start transfer and an end transfer state (shown in the state diagram of FIG. 3). The flow of information through the list control state machine 12 is shown in the state diagram of FIG. 4 beginning in an idle state 38 condition. Arrow 40 shows the state machine transition from the idle state 38 condition to a memory operations state 48. Arrow 42 shows the flow from the idle state 38, to a wait for bus state 44. From the wait for bus state 44, the flow is along either arrow 46 or 43 to the memory operations state 48. There are three choices for returning from the memory operations state 48 to the idle state 38. Arrow 56 flows directly to the idle state 31 whereas arrows 50 and 51 form a return loop through the disconnect command state 52 and target select state 53, respectively. The list control state diagram shows both how an initiator node connects with a bus and initializes itself for communicating with a target node; and how a target node prepares itself to communicate. Further, the state diagram shows how the nodes disconnect from the bus. The details of the changing states for all the state machines will be discussed below in connection with an example of their operation.

Figure 5:
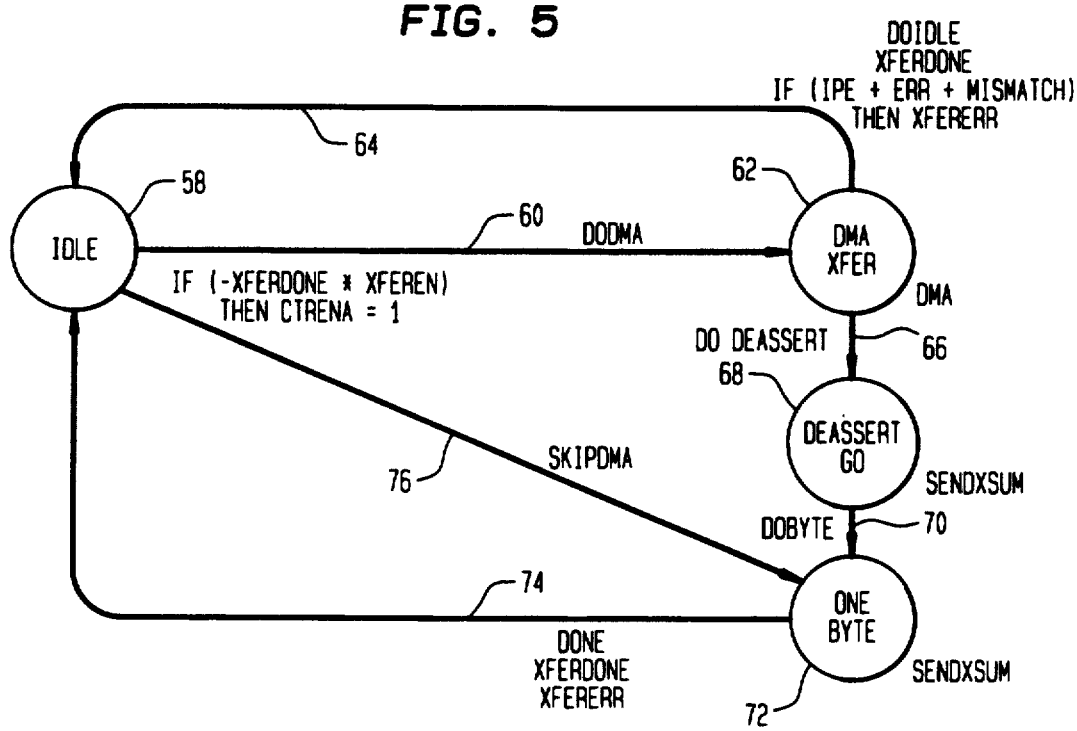
FIG. 5 is a state diagram for the transfer state machine of FIG. 2.

FIG. 5 shows the state diagram for the transfer state machine 14 which operates the data path. FIG. 5A is a table listing the modes of the transfer state machine 14 and the conditions on which those modes will branch in the state diagram of FIG. 5. The transfer state diagram explains the state changes occurring at the Command transfer, Data transfer and Status transfer states 20, 26 and 30 shown in the main state diagram of FIG. 3. The transfer state machine 14 remains in the Idle state 58 waiting for the main state machine 10 to enter either the Command transfer, Data transfer or Status transfer phases. When the state machine 14 enters one of the above transfer phases, the transfer state machine 14 is enabled. The machine 14 then branches from Idle state 58 along arrow 60 to a DMA transfer state 62 or through arrow 76 to a One Byte state 72 depending upon the branch conditions shown in table 5A. DMA transfer state 62 returns to Idle state 58 via arrow 64 or goes to a Deassert Go state 68 via arrow 66 depending upon the outcome of the DMA transfer. The Deassert Go state 68 changes through arrow 70 to the One Byte state 72 which returns to the Idle state 58 as shown by arrow 74.

An example of the atomic ordered sequence of phase transitions used in the interface bus of the present invention is given below. The operation of the information phase transitions on the bus will be illustrated with reference to the state diagrams of the state machines. Each device or node in the system has its own interface controller which follows the state diagrams. The paths which each node follows, however, are dependent upon whether it is the initiator or the target device. A phase transfer begins with the bus in the bus free phase wherein none of the nodes are on the bus.

Referring now to FIG. 3, there is shown the main control state diagram beginning with the start transfer state 16. In operation, a selection phase enables the start transfer states 16 for the two nodes active in the information transfer. The selection phase also determines if the node is an initiator or a target node. The start transfer state 16 of FIG. 3 enables the list control state machine 12 (LCTRLEN) having the state diagram shown in FIG. 4.

Referring to FIG. 4, beginning at the idle state 38, the list control state diagram describes the flow of a node selected as either a target or an initiator. If the node is a target node, then the flow of the state diagram follows arrow 40 to the memory operations state 48. During the memory operations state 48, the list control state machine 12 prepares the appropriate data to be used in the information transfer. If instead the device wants to be an initiator, then the state changes to the wait for bus state 44 as shown by arrow 42. The device arbitrates for the bus (ARBCOMM) to become an initiator while in the wait for bus state 44 and, if the arbitration is won (ARBWON) then changes states as shown by arrow 46 to the memory operations state 48. If the device loses the arbitration but yet is selected as a target device, then the transfer state machine changes from the wait for bus state 44 to the memory operations state 48 as shown by arrow 43.

Once the target's LCTRLDONE signal is asserted i.e. the target's memory operations are completed, the target's list control state machine 12 returns to idle state 38 as shown by arrow 56. Upon completion of the initiator's memory operations, however, the initiator node must select the target as shown by target select state 53. This occurs because the initiator node wants to send data to the target. Once the target select state 53 finishes, then a LCTRLDONE signal is asserted and the initiator's list control state machine returns to the idle state 38 as shown by arrow 55.

Returning to FIG. 3, both the initiator's and the target's main state machines have received LCTRLDONE signals and therefore proceed to the command transfer state 20 as shown by arrow 18. The command transfer state 20 is the beginning of the information phase transitions following the atomic ordered sequence The command transfer state 20 enables the transfer state machine 14 whose operation is shown by the transfer state diagram of FIG. 5 and FIG. 5A. The transfer state machine 14 is enabled when the command transfer state 20 is in the Command Out phase (PHASE=COMMAND OUT) and a command transfer signal (COMXFER) is asserted.

Referring to FIG. 5, the idle state 58 is activated by the transfer enable (XFEREN) signal which occurs at the command transfer state 20. The flow of the transfer state diagram depends upon the mode of operation of the node. In our example, the target is receiving command/data and is therefore in mode B as shown in FIG. 5A. The initiator is sending command/data and is therefore in mode D.

Continuing in FIG. 5, both the target's and the initiator's transfer state machines branch on arrow 60 to the DMA transfer state 62. Because of the atomic ordered sequence the DMA must be a seven byte transfer as defined in the Command Out phase. The DMA transfer state 62 asserts a GO signal upon beginning its operation. Depending upon the operation of the DMA transfer, the target's transfer state machine 14 will either change to the Deassert Go state 68 as shown by arrow 66, or return to the idle state 58 as shown by arrow 64. As shown in the table, if the target's DMA transfer is done (DONE) without having a parity (−IPE), header bytes (−ERR) or bus phase mismatch error (−MISMATCH), then the target's transfer state machine 14 will change to the Deassert Go state 68. In the Deassert Go state 68, the Go signal is deasserted so that another DMA operation can begin. However, if the transfer is done (DONE) and there is a parity error (IPE) or a command byte error (ERR) then the target's transfer state machine 14 will return to the idle state 58 as shown by arrow 64. If the transfer state machine 14 follows arrow 64, then a transfer done (XFERDONE) with an error signal (XFERERR) is asserted.

Again from FIG. 5A, if the initiator's DMA transfer is done with a mismatch error (DONE * MISMATCH) then the initiator's transfer state machine 14 returns to the idle state 58 and a done with error (XFERDONE and XFERERR) signal is asserted. The initiator's transfer state machine 14 proceeds to the Deassert Go state 68 if the DMA transfer is done without a bus phase mismatch (DONE and −MISMATCH).

In the Deassert Go state 68, the go signal is deasserted, after completing the DMA transfer, and the state changes to the One Byte state 72. In the One Byte state 72, the checksum byte is transferred. Depending upon the result from the One Byte state 72, either a XFERDONE signal or a XFERDONE with XFERERR signal is asserted and the state of the transfer state machine returns to idle 58 as shown by arrow 74.

Referring now back to FIG. 3, if the Command Out transfer was completed without an error (XFERDONE*−XFERERR), then the information phase changes to the data transfer state 26 as shown by arrow 22. However, if an error is detected in the Command Out phase (XFERDONE * XFERERR), then the information phase goes directly to the status transfer state 30 as shown by arrow 24. This direct transition, in the event of an error, increases the operating speed of the interface bus by completely bypassing the data phase.

In the example, the data transfer state 26 is now in the Data Out phase (PHASE=DATA OUT) and the transfer is enabled (XFEREN). This again enables the transfer state machine 14. Referring back to the transfer machine state diagram of FIG. 5, the Data Out phase will begin a transfer Both the initiator's and target's transfer state machines operate in the Data Out phase as previously described above for the Command Out phase. However, the length of the DMA transfer state 62 depends on the value of the frame length bytes loaded in the previous Command Out phase (described below).

Returning now to FIG. 3, the main state machine 10 in the data transfer state 26 asserts either a transfer done (XFERDONE) or a transfer done with error (XFERDONE * XFERERROR) signal and changes to the status transfer state 30 as shown by arrow 28. If the transfer is done without a transfer error signal (−XFERERR), then a status bit is set to indicate a good or ACK status.

Status transfer state 30 is the Status In phase of the atomic sequence of information phase transitions. The status transfer state 30 enables the idle state 58 in the state diagram for the transfer state machine 14. Because the transfer state machine 14 is now in the Status phase, FIG. 5A shows that the target will be in the send status mode A while the initiator will be in the receive status mode C. Further, as shown in the table, both the initiator's and the target's transfer state machines 14 branch along the Skip DMA path 76 to the One Byte state 72. The send status mode A transfers only one byte of information from the target to the initiator because the status signal is only a single byte, i.e ACK or NAK. In the same light, the initiator receive status mode C only needs to process one byte.

When completed, the transfer state machines 14 return from the One Byte state 72 to the idle state 58 as shown by arrow 74 for both the initiator's and target's transfer state machines 14.

Continuing the example, as shown in FIG. 3, the status transfer state 30 which asserted either the ACK or NAK signal changes to the end transfer state 34 as shown by arrow 32. The end transfer state 34 enables the list control state machine 12. In FIG. 4, the idle state 38 of the list control state diagram is activated during the end transfer state 34 and changes, as shown by arrow 40, to the memory operations state 48. Both the target's and the initiator's list control state machines 12 make the same transition. The memory operations state 48 performs the final operations for the end of the information phase transitions.

After the memory operations state 48 completes, the list control state machine 12 changes to the disconnect command state 52 as shown by arrow 40. In the disconnect command state 52, both the target and the initiator are disconnected from the bus (DISCOMM) and the list control state machine 12 returns to the idle state 38 as shown by arrow 54. A list control done (LCTRLDONE) signal is therefore asserted.

During the end transfer state 34 of the main state diagram, the main state machine 10 reads the LCTRLDONE signal and asserts LISTDONE. The main state diagram then flows to the start transfer state 16 as shown by arrow 36. Thus, either an ACK or NAK signal is returned from the Status In phase. Once the information phase transitions have returned to the start transfer state 16 both nodes are off of the bus and the bus returns to the bus free condition.

The above example illustrates the phase transitions using the atomic sequence occurring in the information phases. The limited number of phases and strict order of transitions allows the interface protocols to be designed purely in hardware.

Figure 6:
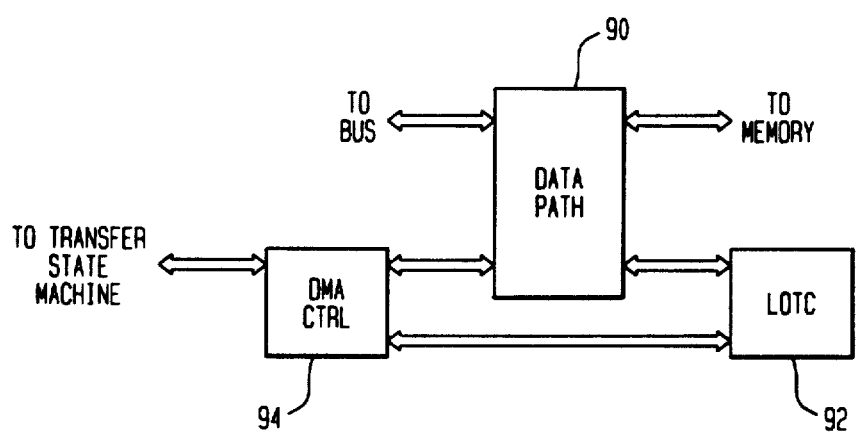
FIG. 6 is a block diagram of the datamover of the present invention.

FIG. 6 illustrates in block diagram form the datamover used in the information transfer phases. The datamover contains a data path block 90 coupled to both a length of transfer counter block 92 and a direct memory access (DMA) control block 94. Further, the DMA control block 94 is coupled to the length of transfer counter block 92. The transfer state machine 14 operates the data path block 90 through the DMA control block 94.

Figure 7:
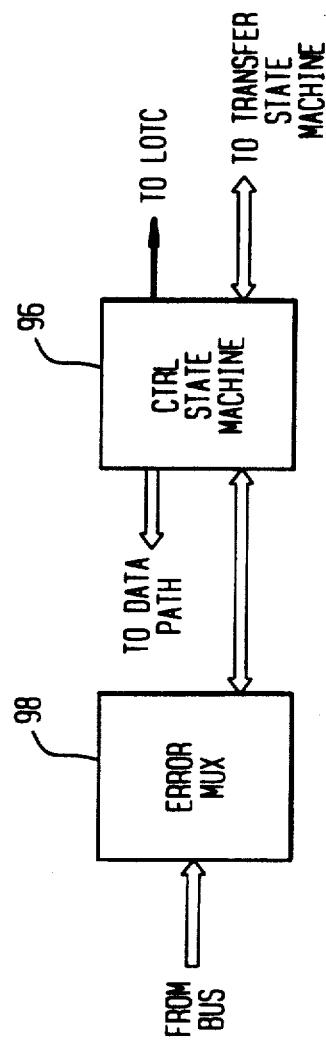
FIG. 7 is a block diagram of the DMA control state machines of FIG. 6.

FIG. 7 shows a block diagram of a portion of the DMA control block 94. The DMA control block diagram includes a control state machine block 96 coupled with an error mux block 98. The control state machine block 96 interfaces between the transfer state machine 14 and the actual physical gates of the controller. The error mux block 98 continuously checks for error conditions in the bytes of information that are transferred during the phases.

Figure 8:
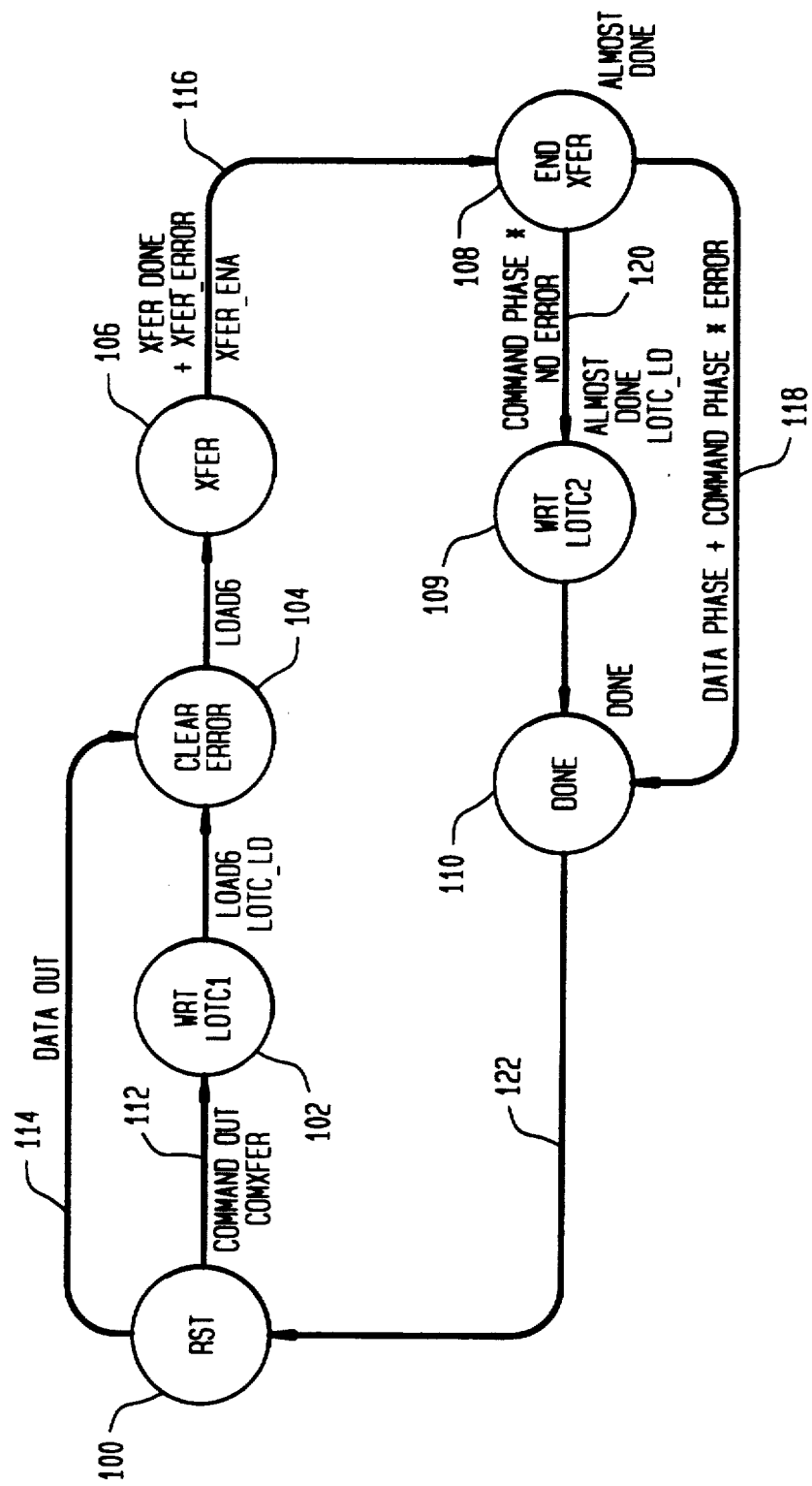
FIG. 8 is a state diagram for the control state machine of FIG. 7.

Referring to FIG. 8, there is shown a state diagram for the state machine 96. This state diagram illustrates the operation of the control state machine for controlling the data path. An example of the flow through the control state machine 96 begins with the control state machine in the Command Out information transfer phase as defined in the ordered atomic sequence. In the reset state 100, the control state machine recognizes a command out transfer (COMXFER) and changes to the write length-of-transfer-counter 1 (WRT LOTC1) state 102 as shown by arrow 112. The control state machine in the WRT LOTC1 state 102 loads the value of six (LOTC LD and LOAD6) into a length of transfer counter. This is because the Command Out phase in the atomic ordered sequence is required to have six bytes of header information that is transferred to the target. The seventh byte i.e., checksum, does not use the data path. Therefore, the transfer finishes when the counter decrements to 0.

The control state machine in the command transfer phase, next changes to the clear error state 104. The control state machine in the clear error state 104 clears out any error signals which were stored in the previous operations such as parity or checksum errors. From the clear error state 104, the control state machine changes to the transfer state 106. The control state machine in the transfer state 106 is enabled (XFER_ENA) thus instructing the data path to begin running the DMA engine. In the transfer state 106, t he control state machine then waits for either a transfer done (XFER_DONE) signal or an error (XFER_ERROR) signal to be asserted from the data path. The error signal (XFER_ERROR) which may be asserted would be generated from the error mux block 98 of FIG. 6.

Once either the transfer done or the transfer error signal is asserted, the control state machine 96 changes to the end transfer state 108, as shown by arrow 116, where the end transfer state 108 delays the transfer state machine until the DMA is fully completed. If there is no error in the Command Out phase, the control state machine will change from the end transfer state 108 to the WRT LOTC2 state 109 as shown by arrow 120. If an error is encountered in the Command Out phase (Command Error), then the WRT LOTC2 state 109 is bypassed as shown by arrow 118. Assuming that an error does not occur, the control state machine during the WRT LOTC2 state 109 loads the length of transfer counter with the value specified in the Command Out frame length bytes. This value determines the number of data bytes in the Data Out phase following the Command Out phase. The frame length bytes are the last two Command Out phase bytes before the checksum byte as defined by the atomic sequence. Thus, the number of bytes in the Data Out phase are stored prior to the occurrence of the Data Out phase. The control state machine changes from WRT LOTC2 state 109 to the Done state 110 and then back to the reset state 100 as shown by arrow 122.

After a successful completion of the Command Out phase, the information phase transitions to the Data Out phase. In the Data Out phase, the control state machine 96 operates as shown in the state diagram and described below. The reset block 100 is enabled and the control state machine 96 in the Data Out phase changes to the clear error state 104 as shown by arrow 114. There is no need for the control state machine 96 in the Data Out phase to go through a WRT LOTC1 state 102 as the number of byte transfers has previously been loaded from the Command Out phase by the WRT LOTC2 state 109.

From the clear error state 104, the control state machine 96 in the Data Out phase changes to the transfer state 106 and then to the end transfer state 108 as was done previously in the Command Out phase. Following the end transfer state 108, the control state machine 96 in the Data Out phase then changes back to the reset state 100 through the DONE state 110. Because the control state machine 96 is a DMA controller, the Status In phase, being a single byte, is therefore not operated by the control state machine.

Figure 9:
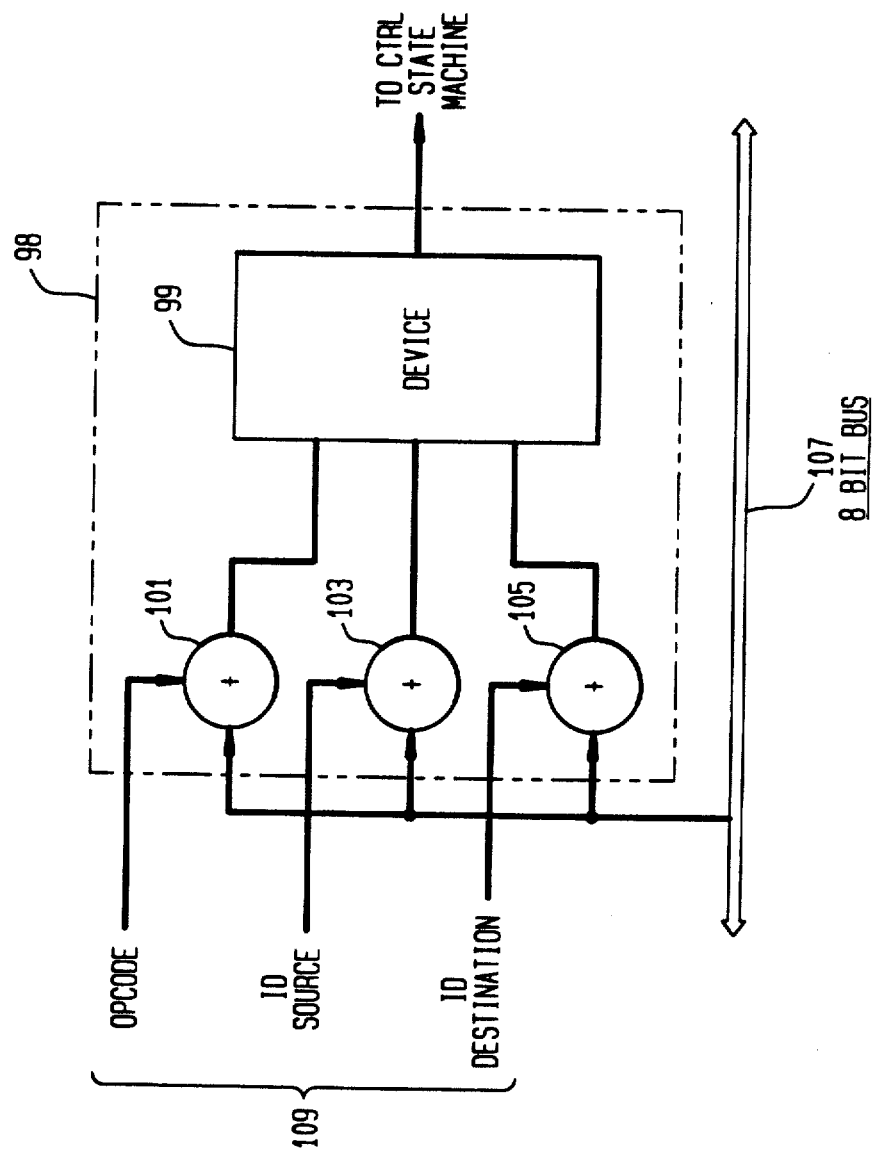
FIG. 9 is a logic diagram for the error mux block of FIG. 7.

Referring to FIG. 9, the operation of the error mux block 98 will now be described. The error mux block 98 contains a multiplexer (MUX) 99 receiving error signals from continuously operating comparators 101, 103, and 105 which compare whatever is on the data bus 107 against the proper error bits 109. The error mux block 98 switches in the correct error signal to the control state machine at the appropriate time for that error signal to be checked. The error mux block 98 performs automatic checking of the data link operation code, and the destination/source port.

Figure 10:
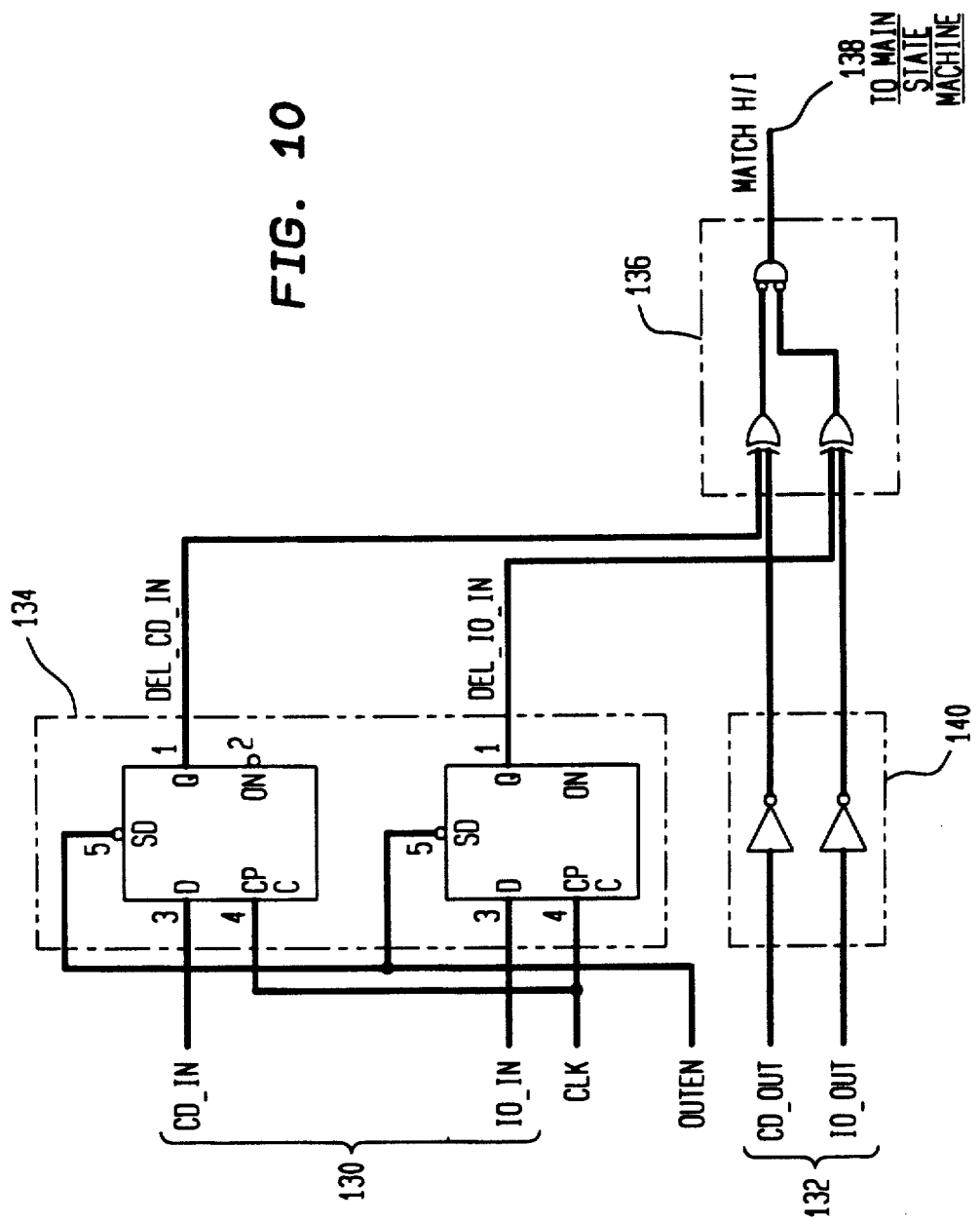
FIG. 10 is a logic diagram for the header check of the present invention.

Another advantage of the atomic ordered sequence is shown in FIG. 10 where a match or mismatch signal is output to the main control state machine 10 depending upon the C/D status line and the I/O status line. This allows the initiator node to determine if it is in the correct phase with the target node on the bus. FIG. 10 shows the logic diagram for the transfer control which generates the match or mismatch signal from the status lines. The C/D In and I/O In status bit lines 130 are all coupled to a set of synchronizers 134. The C/D Out and I/O Out Status bits on lines 132 are fed through the set of inverters 140 to a comparator 136. Further, the output from the synchronizers 134 also enters the comparator 136. The comparator 136 compares the expected C/D and I/O to the actual C/D and I/O to determine if the proper nodes are communicating. The output from the comparator 136 sends a match signal to the main control state machine if the incoming status bits and the expected status bits are equal.

What is claimed is:

1. A method for transferring information between at least two devices coupled to a common parallel bus during information transfer phases of a bus protocol controlling the parallel bus, one of the devices being an initiator and another being a target, the bus having separate data and control lines and operating according to a sequence of bus phases including the information phases, the information phases comprising a first information phase allowing the transfer of header information over the bus, a second information phase allowing the transfer of data information over the bus, and a third information phase allowing the transfer of status information over the bus, the method of transferring information during the information transfer phases consisting of the steps of:
  (a) placing a first control signal on one or more control lines indicating the bus is in the first information phase, and transferring header information over the bus from the initiator to the target;
  (b) placing a second control signal on one or more control lines indicating the bus is in the second information phase, the bus having transitioned from the first information phase, and transferring data information over the bus from the initiator to the target; and
  (c) placing a third control signal on one or more control lines indicating the bus is in the third information phase, the bus having transitioned from the second information phase to the third information phase, and transferring status information over the bus from the target to the initiator;
  (d) performing the steps of placing the control signals on one or more control lines only in the order of placing the first control signal, followed by placing the second control signal, followed by placing the third control signal to cause all transfers of information between at least two devices during the information transfer phases, always to occur only in the order of header information from the initiator to the target, data information from the initiator to the target and status information from the target to the initiator, the order being independent of the configuration of the initiator and the target and independent of the type of information transfer.

2. A method according to claim 1 wherein the placing of the first, second and third control signals on the bus is performed by the target.

3. A method according to claim 1 wherein when the bus is in the third information phase the status information comprises either:
  (a) an ACK signal, if data information is transferred during the second information phase and an error is not detected; or
  (b) a NAK signal, if data information is transferred during the second information phase and an error is detected.

4. A method according to claim 1, wherein the bus phases include a selection phase, the selection phase including a transfer of initiator ID and target ID information from the initiator to the target, and further comprising, when the bus is in the first information phase:
  (a) transferring a target ID and initiator ID to the target, the target having a target ID received during the selection phase and an initiator ID received during the selection phase; and
  (b) comparing the transferred target ID with the target ID received during the selection phase and comparing the transferred initiator ID with the initiator ID received during the selection phase.

5. A method according to claim 4 wherein the transferred destination ID and source ID are transferred as part of the header information.

6. A method according to claim 1 wherein the header information comprises a seven-byte format.

7. A method according to claim 1 wherein the header information comprises a number specifying the quantity of information bytes to be transferred in the second information phase, the information bytes forming a portion of the data information.

8. A method according to claim 7 wherein the number specifying the quantity of information bytes to be transferred in the second information phase is arranged in a two-byte format.

9. A method according to claim 1 wherein the header information comprises a data link operation code.

10. A method according to claim 1 wherein the header information comprises a REQ/ACK offset.

11. A method according to claim 1 wherein the header information comprises destination ID information.

12. A method according to claim 1 wherein the header information comprises source ID information.

13. A method according to claim 1 wherein the header information comprises a checksum.

14. A method according to claim 1 wherein the header information comprises:
  (a) a data link operation code;
  (b) a REQ/ACK offset;
  (c) destination ID information;
  (d) source ID information;
  (e) a number specifying the quantity of information bytes to be transferred in the second information phase, the information bytes forming a portion of the data information; and
  (f) a checksum.

15. A method according to claim 1 wherein the status information comprises a one-byte format.

16. A method according to claim 1 wherein the data information comprises an operation mode.

17. A method according to claim 1 wherein the data information comprises a flags byte.

18. A method according to claim 1 wherein the data information comprises one or more information bytes.

19. A method according to claim 1 wherein the data information comprises a checksum.

20. A method according to claim 1 wherein the data information comprises:
  (a) an operation code;
  (b) a flags byte;
  (c) one or more information bytes; and
  (d) a checksum.

21. A method according to claim 1 wherein the target comprises a first state machine, the state machine including states which correspond to the first, second and third information phases of the bus.

22. A method according to claim 21 wherein the first state machine enables a second state machine, the second state machine controlling the target's preparation for transferring information over the bus.

23. A method according to claim 22 wherein the first state machine further enables a third state machine, the third state machine controlling the operation of the target in receiving information in the first and second information phases and in sending information in the third information phase.

24. A method according to claim 21 wherein the first state machine enables a third state machine, the third state machine controlling the operation of the target in receiving information in the first and second information phases and in sending information in the third information phase.

25. A method according to claim 1 wherein the initiator comprises a first state machine, the state machine including states which correspond to the first, second and third information phases of the bus.

26. A method according to claim 25 wherein the first state machine enables a second state machine, the second state machine controlling the initiator's preparation for transferring information over the bus.

27. A method according to claim 26 wherein the first state machine further enables a third state machine, the third state machine controlling the operation of the initiator in sending information in the first and second information phases and in receiving information in the third information phase.

28. A method according to claim 25 wherein the first state machine enables a third state machine, the third state machine controlling the operation of the initiator in sending information in the first and second information phases and in receiving information in the third information phase.

29. A method according to claim 1 further comprising when the bus is in the first information phase:
 (a) transferring a first value from the initiator to the target, the target having associated with it a second value;
 (b) comparing the first value with the second value; and
 (c) selecting the smaller of the first and second values as a REQ/ACK offset value for an information transfer.

30. A method according to claim 29 wherein the first value is a maximum REQ/ACK offset value of the initiator.

31. A method according to claim 29 wherein the second value corresponds to the size of a buffer in the target.

32. A method according to claim 29 wherein the first value forms a portion of the header information.

33. A method according to claim 1 wherein the data information comprises command information.

34. A method for transferring information between at least two devices coupled to a common parallel bus during information transfer phases of a bus protocol controlling the parallel bus, one of the devices being an initiator and another being a target, the bus having separate data and control lines and operating according to a sequence of bus phases including the information phases, the information phases comprising a first information phase allowing the transfer of header information over the bus, a second information phase allowing the transfer of data information over the bus, and a third information phase allowing the transfer of status information over the bus, the method of transferring information during the information transfer phases consisting of the steps of:
 (a) placing a first control signal on one or more lines indicating the bus in the first information phase, and transferring header information over the bus from the initiator to the target;
 (b) monitoring the transfer of header information to determine whether one or more error conditions have occurred;
 (c) if the one or more error conditions have not occurred, placing a second control signal on one or more control lines indicating the bus is in the second information phase, the bus having transistioned from the first information phase to the second information phase, and transferring data information over the bus from the initiator to the target; and
 (d) placing a third control signal on one or more control lines indicating the bus is in the third information phase, the bus having transitioned to the third information phase from either:
  (i) the first information phase if the one or more error conditions have occurred, or
  (ii) the second information phase if the one or more error conditions have not occurred;
 (e) performing the steps of placing the control signals on one or more control lines only in the order of placing the first control signal, followed by placing the second control signal, followed by placing the third control signal when the one or more error conditions have not occured, to cause all transfers of information between at least two devices during the information transfer phases, always to occur only in the order of header information from the initiator to the target, data information from the initiator to the target and status information from the target to the initiator when the one or more error conditions have not occurred; and
 (f) performing the steps of placing the control signals on one or more control lines only in the order of placing the first control signal followed by placing the third control signal when the one or more error conditions have occurred, to cause all transfers of information between at least two devices during the information transfer phases, always to occur only in the order of header information from the initiator to the target and status information from the target to the initiator when the one or more error conditions have occurred;

the order of phase transitions of steps (e) and (f) being independent of the configuration of the initiator and the target and independent of the type of information transfer.

35. A method according to claim 34 wherein the placing of the first, second and third control signals on the bus is performed by the target.

36. A method according to claim 34 wherein when the bus is in the third information phase the status information comprises either:
 (a) an ACK signal, if data information is transferred during the second information phase and an error is not detected; or
 (b) a NAK signal, if data information is transferred during the second information phase and an error is detected.

37. A method according to claim 34, wherein the bus phases include a selection phase, the selection phase including a transfer of initiator ID and target ID information from the initiator to the target, and further comprising when the bus is in the first information phase, transferring an initiator ID and target ID to the target, the target having an initiator ID received during the selection phase and a target ID received during the selection phase; wherein the step of monitoring the transfer of header information comprises comparing the transferred target ID with the target ID received during the selection phase and comparing the transferred initiator ID with the initiator ID received during the selection phase.

38. A method according to claim 34 wherein the header information comprises a seven-byte format.

39. A method according to claim 34 wherein the header information comprises a number specifying the quantity of information bytes to be transferred in the second information phase, the information bytes forming a portion of the data information.

40. A method according to claim 39 wherein the number specifying the quantity of information bytes to be transferred in the second information phase is arranged in a two-byte format.

41. A method according to claim 34 wherein the header information comprises a data link operation code.

42. A method according to claim 34 wherein the header information comprises a REQ/ACK offset.

43. A method according to claim 34 wherein the header information comprises destination ID information.

44. A method according to claim 34 wherein the header information comprises source ID information.

45. A method according to claim 34 wherein the header information comprises a checksum.

46. A method according to claim 34 wherein the header information comprises:
    (a) a data link operation code;
    (b) a REQ/ACK offset;
    (c) destination ID information;
    (d) source ID information;
    (e) a number specifying the quantity of information bytes to be transferred in the second information phase, the information bytes forming a portion of the data information; and
    (f) a checksum.

47. A method according to claim 34 wherein the status information comprises a one-byte format.

48. A method according to claim 34 wherein the data information comprises an operation mode.

49. A method according to claim 34 wherein the data information comprises a flags byte.

50. A method according to claim 34 wherein the data information comprises one or more information bytes.

51. A method according to claim 34 wherein the data information comprises a checksum.

52. A method according to claim 34 wherein the data information comprises:
    (a) an operation code;
    (b) a flags byte;
    (c) one or more information bytes; and
    (d) a checksum.

53. A method according to claim 34 wherein the target comprises a first state machine, the state machine including states which correspond to the first, second and third information phases of the bus.

54. A method according to claim 53 wherein the first state machine enables a third state machine, the third state machine controlling the operation of the target in receiving information in the first and second information phases and in sending information in the third information phase.

55. A method according to claim 53 wherein the first state machine enables a second state machine, the second state machine controlling the target's preparation for transferring information over the bus.

56. A method according to claim 55 wherein the first state machine further enables a third state machine, the third state machine controlling the operation of the target in receiving information in the first and second information phases and in sending information in the third information phase.

57. A method according to claim 34 wherein the initiator comprises a first state machine, the state machine including states which correspond to the first, second and third information phases of the bus.

58. A method according to claim 57 wherein the first state machine enables a second state machine, the second state machine controlling the initiator's preparation for transferring information over the bus.

59. A method according to claim 58 wherein the first state machine further enables a third state machine, the third state machine controlling the operation of the initiator in sending information in the first and second information phases and in receiving information in the third information phase.

60. A method according to claim 57 wherein the first state machine enables a third state machine, the third state machine controlling the operation of the initiator in sending information in the first and second information phases and in receiving information in the third information phase.

61. A method according to claim 34 further comprising when the bus is in the first information phase:
    (a) transferring a first value from the initiator to the target, the target having associated with it a second value;
    (b) comparing the first value with the second value; and
    (c) selecting the smaller of the first and second values as a REQ/ACK offset value for an information transfer.

62. A method according to claim 61 wherein the first value is a maximum REQ/ACK offset value of the initiator.

63. A method according to claim 61 wherein the second value corresponds to the size of a buffer in the target.

64. A method according to claim 61 wherein the first value forms a portion of the header information.

65. A method according to claim 34 wherein the data information comprises command information.

66. A computer system comprising a system bus and two or more devices coupled to said bus, one of the devices being an initiator and another being a target, said bus comprising separate data and control lines, and operating according to a sequence of bus phases including information phases to allow for a transfer of information between the initiator and the target, the information phases comprising a first information phase allowing the transfer of header information from the initiator to the target over said bus, a second information phase allowing the transfer of data information from the initiator to the target over said bus, and a third information phase allowing the transfer of status information from the target to the initiator over said bus, the initiator comprising:
    (a) an information phase control signal receiver coupled to one or more of the control lines of said bus to receive information phase control signals transmitted from the target over the one or more control lines, the information phase control signals consisting of a first control signal to indicate said bus is in the first information phase, a second control signal to indicate said bus has transitioned from the first information phase to the second information phase, and a third control signal to indicate said bus has transitioned from the second information phase to the third information phase:
    (b) an information transmitter coupled to the data lines of said bus to transmit to the target header information during the first information phase and data information during the second information phase;

(c) a status receiver coupled to the data lines of said bus to receive from the target status information during the third information phase;

and the target comprising:

(a) an information phase control signal generator coupled to one or more of the control lines of said bus to generate information phase control signals for transmission to the initiator over the one or more control lines, the information phase control signals consisting of a first control signal to indicate said bus is in the first information phase, a second control signal to indicate said bus has transitioned from the first information phase to the second information phase, and a third control signal to indicate said bus has transitioned from the second information phase to the third information phase;

(b) an information receiver coupled to the data lines of said bus to receive from the initiator header information during the first information phase and data information during the second information phase; and (c) a status transmitter coupled to the data lines of said bus to transmit from the target to the initiator status information during the third information phase;

(d) the information phase control signal generator consisting of an information phase transition signal generator controlling generation of the information phase control signals according to a fixed preselected order of information phase transitions to cause all transfers of information between the initiator and the target during the information transfer phases always to occur only in the order of header information from the initiator to the target, data information from the initiator to the target and status information from the target to the initiator, the order being independent of the configuration of the initiator and the target and independent of the type of information transfer.

67. A computer system comprising a system bus and two or more devices coupled to said bus, one of the devices being an initiator and another being a target, said bus comprising separate data and control lines, and operating according to a sequence of bus phases including a selection phase and information phases to allow for a transfer of information between the initiator and the target, the selection phase including a transfer of initiator ID and target ID information from the initiator to the target and the information phases comprising a first information phase allowing the transfer of header information from the initiator to the target over said bus, a second information phase allowing the transfer of data information from the initiator to the target over said bus, and a third information phase allowing the transfer of status information from the target to the initiator over said bus, the initiator comprising:

(a) an information phase control signal receiver coupled to one or more of the control lines of said bus to receive information phase control signals transmitted from the target over the one or more control lines, the information phase control signals consisting of a first control signal to indicate said bus is in the first information phase, a second control signal to indicate said bus has transitioned to the second information phase, and a third control signal to indicate said bus has transitioned to the third information phase;

(b) an information transmitter coupled to the data lines of said bus to transmit from the target header information during the first information phase and data information during the second information phase;

(c) a status receiver coupled to the data lines of said bus to receive from the target status information during the third information phase;

and the target comprising:

(d) an information phase control signal generator coupled to one or more of the control lines of said bus to generate information phase control signals for transmission to the initiator over the one or more control lines, the information phase control signals consisting of a first control signal to indicate said bus is in the first information phase, a second control signal to indicate said bus has transitioned to the second information phase, and a third control signal to indicate said bus has transitioned to the third information phase;

(b) an information receiver coupled to the data lines of said bus to receive from the initiator header information during the first information phase and data information during the second information phase; and (c) a status transmitter coupled to the data lines of said bus to transmit from the target to the initiator status information during the third information phases;

(d) a comparator, coupled to said information receiver, to compare an initiator ID received as a part of header information during the first information phase with the initiator ID received during the selection phase and to compare a target ID received as part of header information during the first information phase with the target ID received during the selection phase to determine if one or more error conditions have occurred;

(e) the information phase control signal generator generating the information phase control signals in response to the determination of the comparator to cause, (i) if the one or more error conditions have not occurred, the information transferred between the initiator and the target during the information transfer phases always to occur only in the order of header information from the initiator to the target, data information from the initiator to the target and status information from the target to the initiator; and (ii) if the one or more error conditions have occurred, the information transferred between the initiator and the target during the information transfer phases always to occur only in the order of header information from the initiator to the target and status information from the target to the initiator;

the order of phase transitions of (i) and (ii) being independent of the configuration of the initiator and the target and independent of the type of information transfer.

68. A target device for coupling to a common parallel bus, the bus having coupled thereto an initiator device, the bus having separate data and control lines, and the bus operating according to a sequence of bus phases including information phases to allow for a transfer of information between the initiator device and the target device, the information phases comprising a first information phase allowing the transfer of header information over the bus, a second information phase allowing the transfer of data information over the bus, and a third information phase allowing the transfer of status information over the bus, said target device comprising:

(a) an information phase control signal generator, for coupling to one or more of the control lines of the bus to generate information phase control signals for transmission from the target device to the initiator device over the one or more control lines, the information phase control signals consisting of a first control signal to indicate the bus is in the first information phase, a second control signal to indicate the bus has transitioned from the first information phase to the second information phase, and a third control signal to indicate the bus has transitioned from the second information phase to the third information phase;

(b) an information receiver, for coupling to the data lines of the bus to receive header information at the target device from the initiator device during the first information phase and data information during the second information phase; and (c) a status transmitter, for coupling to the data lines of the bus to transmit status information from the target device to the initiator device during the third information phase;

(d) the information phase control signal generator consisting of an information phase transition signal generator controlling generation of the information phase control signals to cause all transfers of information between the initiator device and the target device during the information transfer phases always to occur only in the order to header information from the initiator device to the target device, data information from the initiator device to the target device and status information from the target device to the initiator device, the order being independent of the configuration of the initiator and the target and independent of the type of information transfer.

69. A target device according to claim 68, wherein the bus phases include a selection phase and further comprising a comparator, coupled to said information receiver, to compare an initiator ID received as part of header information during the first information phase with an initiator ID received during the selection phase and to compare a target ID received as part of header information during the first information phase with a target ID received during the selection phase.

70. A target device according to claim 68, wherein said control signal generator comprises a first state machine having at least first, second and third states, and wherein the generation of the first control signal is responsive to said first state machine being in the first state, the generation of the second control signal is responsive to said first state machine being in the second state, and the generation of the third control signal is responsive to said first state machine being in the third state.

71. A target device according to claim 70 wherein said status transmitter is responsive to said first state machine such that status transmitter is adapted to transmitted status information when said first state machine is in the third state.

72. A target device according to claim 70 wherein said information receiver is responsive to said state machine such that said information receiver is adapted to receive the header information and the data information when said state machine is in the first and second states, respectively.

73. A target device according to claim 68 wherein the header information comprises a data link operation code.

74. A target device according to claim 68 wherein the header information comprises a REQ/ACK offset.

75. A target device according to claim 68 wherein the header information comprises destination ID information.

76. A target device according to claim 68 wherein the header information comprises source ID information.

77. A target device according to claim 68 wherein the header information comprises a number specifying the quantity of information bytes to be transferred in the second information phase, said information bytes forming a portion of the data information.

78. A target device according to claim 68 wherein the header information comprises a checksum.

79. A target device according to claim 68 wherein the header information comprises:

(a) a data link operation code;
(b) a REQ/ACK offset;
(c) destination ID information;
(d) source ID information;
(e) a number specifying the quantity of information bytes to be transferred during the second information phase, said information bytes forming a portion of the data information; and
(f) a checksum.

80. A target device according to claim 68 wherein the data information comprises an operation code.

81. A method according to claim 68 wherein the data information comprises a flags byte.

82. A method according to claim 68 wherein the data information comprises one or more information bytes.

83. A method according to claim 68 wherein the data information comprises a checksum.

84. A method according to claim 68 wherein the data information comprises:

(a) an operation code;
(b) a flags byte;
(c) one or more information bytes; and
(d) a checksum.

85. A target device according to claim 68 wherein the target device comprises a mass storage device.

86. A target device according to claim 68 wherein the target device comprises an interface.

87. A target device according to claim 68 further comprising a REQ/ACK offset selector, coupled to said information receiver, for selecting the smaller of:

(i) a first value received from the initiator device, and
(ii) a second value associated with said target device as a REQ/ACK offset for said target device.

88. A target device according to claim 87 wherein the first value is a maximum REQ/ACK offset value of the initiator device.

89. A target device according to claim 88 wherein the second value corresponds to the size of a buffer in said target device.

90. A target device according to claim 87 wherein the first value forms a portion of the header information.

91. A target device according to claim 68 wherein the data information comprises command information.

92. An initiator device for coupling to a common parallel bus, the bus having coupled thereto a target device, the bus having separate data and control lines, and the bus operating according to a sequence of bus phases including information phases to allow for a transfer of information between the initiator device and the target device, the information phases comprising a first information phase allowing the transfer of header information over the bus, a second information phase allowing the transfer of data information over the bus, and a third information phase allowing the transfer of status information over the bus, said initiator device comprising:

(a) an information phase control signal receiver, for coupling to one or more of the control lines of the bus to receive information phase control signals transmitted from the target device to the initiator device over the one or more control lines, the information phase control signals consisting of a first control signal to indicate the bus is in the first information phase, a second control signal to indicate the bus has transitioned from the first information phase to the second information phase, and a third control signal to indicate the bus has transitioned from the second information phase to the third information phase;

(b) an information transmitter, coupled to the data lines of the bus to transmit header information to the target device during the first information phase and data information during the second information phase; and (c) a status receiver, coupled to the data lines of the bus to receive status information from the target device during the third information phase;

(d) the information phase control signal receiver consisting of a signal receiver arranged to receive information phase control signals in a fixed preselected order such that all transfers of information between the initiator device and the target device during the information transfer phases always to occur only in the order of header information from the initiator device to the target device, data information from the initiator device to the target device and status information from the target device to the initiator device, the order being independent of the configuration of the initiator and the target and independent of the type of information transfer.

93. An initiator device according to claim 92 wherein said control signal receiver comprises a first state machine having at least first, second and third states, and wherein said first state machine is in the first state in response to the first control signal received from the target device, in the second state in response to the second control signal received from the target device and in the third state in response to the third control signal received from the target device.

94. An initiator device according to claim 93 wherein said information transmitter is responsive to said first state machine such that said information transmitter is adapted to transmit header information when said first state machine is in the first state and data information when said first state machine is in the second state.

95. An initiator device according to claim 93 wherein said status receiver is responsive to said state machine such that the status receiver is adapted to receive said status information when said state machine is in the third state.

96. A target device according to claim 92 wherein the header information comprises a data link operation code.

97. A target device according to claim 92 wherein the header information comprises a REQ/ACK offset.

98. A target device according to claim 92 wherein the header information comprises destination ID information.

99. A target device according to claim 92 wherein the header information comprises source ID information.

100. A initiator device according to claim 92 wherein the header information comprises a number specifying the quantity of information bytes to be transferred in the second information phase, said information bytes forming a portion of the data information.

101. A target device according to claim 92 wherein the header information comprises a checksum.

102. A target device according to claim 92 wherein the header information comprises:
  (a) a data link operation code;
  (b) a REQ/ACK offset;
  (c) destination ID information;
  (d) source ID information;
  (e) a number specifying the quantity of information bytes to be transferred during the second information phase, said information bytes forming a portion of the data information; and
  (f) a checksum.

103. An initiator device according to claim 92 wherein the data information comprises an operation code.

104. An initiator according to claim 92 wherein the data information comprises a flags byte.

105. An initiator according to claim 92 wherein the data information comprises one or more information bytes.

106. An initiator according to claim 92 wherein the data information comprises a checksum.

107. An initiator according to claim 92 wherein the data information comprises:
  (a) an operation code;
  (b) a flags byte;
  (c) one or more information bytes; and
  (d) a checksum.

108. An initiator device according to claim 92 wherein the initiator device comprises a mass storage device.

109. An initiator device according to claim 92 wherein the initiator device comprises an interface.

110. An initiator device according to claim 92 wherein the data information comprises command information.

111. A target device for coupling to a common parallel bus, the bus having coupled thereto an initiator device, the bus having separate data and control lines, and the bus operating according to a sequence of bus phases including a selection phase and information phases to allow for a transfer of information between the initiator device and the target device, the selection phase including a transfer of initiator ID and target ID information from the initiator to the target and the information phases comprising a first information phase allowing the transfer of header information over the bus, a second information phase allowing the transfer of data information over the bus, and a third information phase allowing the transfer of status information over the bus, the target device comprising:

(a) an information phase control signal generator, for coupling to one or more of the control lines of the bus to generate information phase control signals for transmission to the initiator device over the one or more control lines, the information phase control signals consisting of a first control signal to indicate the bus is in the first information phase, a second control signal to indicate the bus has transitioned to the second information phase, and a third control signal to indicate the bus has transitioned to the third information phase;

(b) an information receiver, for coupling to the data lines of the bus to receive from the initiator device header information during the first information phase and data information during the second information phase;

(c) a status transmitter, for coupling to the data lines of the bus to transmit to the initiator device status information during the third information phase;

(d) a comparator, coupled to said information receiver, to compare an initiator ID received as a part of header information during the first information phase with the initiator ID received during the selection phase and to compare a target ID received as part of header information during the first information phase with the target ID received during the selection phase to determine if one or more error conditions have occurred;

(e) the information phase control signal generator generating the information phase control signals in response to the determination of the comparator to cause, (i) if the one or more error conditions have not occurred, the information transferred between the initiator and the target devices during the information transfer phases always to occur only in the order of header information from the initiator device to the target device, data information from the initiator device to the target device and status information from the target device to the initiator device; and (ii) if the one or more error conditions have occurred, the information transferred between the initiator and the target devices during the information transfer phases away to occur only in the order of header information from the initiator device to the target device and status information from the target device to the initiator device;

the order of phase transitions of (i) and (ii) being independent of the configuration of the initiator and the target and independent of the type of information transfer.

112. A target device according to claim 111 wherein the header information comprises:
 (a) a data link operation code;
 (b) a REQ/ACK offset;
 (c) destination ID information;
 (d) source ID information;
 (e) a number specifying the quantity of information bytes to be transferred during the second information phase, said information bytes forming a portion of the data information; and
 (f) a checksum.

113. A target device according to claim 111 wherein the data information comprises:
 (a) an operation code;
 (b) a flags byte;
 (c) one or more information bytes; and
 (d) a checksum.

114. A target device according to claim 111 wherein the data information comprises command information.

115. A target device for coupling to a common parallel bus, the bus having coupled thereto an initiator device, the bus having separate data and control lines, and the bus operating according to a sequence of bus phases including information phases to allow for a transfer of information between the initiator device and the target device, the information phases comprising a first information phase allowing the transfer of header information over the bus, a second information phase allowing the transfer of data information over the bus, and a third information phase allowing the transfer of status information over the bus, said target device comprising:

(a) means for placing a first control signal on one or more control lines indicating the bus is in the first information phase;

(b) means responsive to the bus being in the first information phase to receive header information over said bus from the initiator device;

(c) means for placing a second control signal on one or more control lines indicating the bus is in the second information phase, the bus having transitioned from the first information phase;

(d) means responsive to the bus being in the second information phase to receive data information over the bus from the initiator device;

(e) means for placing a third control signal on one or more control lines indicating the bus is in the third information phase, the bus having transitioned from the second information phase to the third information phase;

(f) means responsive to the bus being in the third information phase to transfer status information over the bus from the target device to the initiator device; and (g) means for controlling the means for placing a first control signal, the means for placing a second control signal and the means for placing a third control signal according to a fixed preselected order of information phase transitions to cause all transfers of information between the target device and the initiator device during the information transfer phases always to occur only in the order of header information from the initiator device to the target device, data information from the initiator device to the target device and status information from the target device to the initiator device, the order being independent of the configuration of the initiator and the target and independent of the type of information transfer.

116. A target device according to claim 115 wherein the data information comprises command information.

117. An initiator device adapted to be coupled to a common parallel bus, the bus having coupled thereto a target device, the bus having separate data and control lines, and the bus operating according to a sequence of bus phases including information phases to allow for a transfer of information between the initiator device and the target device, the information phases comprising a first information phase allowing the transfer of header information over the bus, a second information phase allowing the transfer of data information over the bus, and a third information phase allowing the transfer of status information over the bus, said initiator device comprising:

(a) means for transferring header information over the bus to the target device in response to a first control signal placed on one or more control lines by the target device indicating the bus is in the first information phase;

(b) means for transferring data information over the bus to the target device in response to a second control signal on one or more control lines indicating the bus is in the second information phase, the bus having transitioned from the first information phase;

(c) means for receiving status information over the bus from the target device in response to a third control signal on one or more control lines indicating the bus is in the third information phase, the bus having transitioned from the second information phase to the third information phase; and (d) means for controlling the means for transferring header information, the means for transferring data information and the means for receiving status information to cause all transfers of information between the initiator device and the target device during the information transfer phases always to occur only in a preselected order of header information from the initiator device to the target device, data information from the initiator device to the target device and status information from the target device to the initiator device, the order being independent of the configuration of the initiator and the target and independent of the type of information transfer.

118. An initiator device according to claim 117 wherein the data information comprises command information.

119. A target device for coupling to a common parallel bus, the bus having coupled thereto an initiator device, the bus having separate data and control lines, and the bus operating according to a sequence of bus phases including information phases to allow for a transfer of information between the initiator device and the target device, the information phases comprising a first information phase allowing the transfer of header information over the bus, a second information phase allowing the transfer of data information over the bus, and a third information phase allowing the transfer of status information over the bus, said target device comprising:

(a) means for placing a first control signal on one or more lines indicating the bus is in the first information phase;

(b) means responsive to the bus being in the first information phase to receive header information over the bus from the initiator device;

(c) means for monitoring the transfer of header information to determine whether one or more error conditions have occurred;

(d) means for placing a second control signal on one or more control lines indicating the bus is in the second information phase if said one or more error conditions have not occurred, the bus having transitioned from the first information phase to the second information phase;

(e) means responsive to the bus being in the second information phase to receive data information over the bus from the initiator device to the target device;

(f) means for placing a third control signal on one or more control lines indicating the bus is in the third information phase, the bus having transitioned to the third information phase from either:
  (i) said first information phase if said one or more error conditions have occurred, or
  (ii) said second information phase if said one or more error conditions have not occurred;

(g) means responsive to the bus being in the third information phase to transfer status information over said bus from the target device to the initiator device; and (h) means for controlling the means for placing a first control signal, the means for placing a second control signal and the means for placing a third control signal to generate the control signals in response to the determination of the means for monitoring to cause,
  (i) if said one or more error conditions have not occurred, the information transferred between the target device the initiator device during the information transfer phases always to occur only in the order of header information from the initiator device to the target device, data information from the initiator device to the target device and status information from the target device to the initiator device; and
  (ii) if said one or more error conditions have occurred, the information transferred between the target device and the initiator device during the information transfer phases always to occur only in the order of header information from the initiator device to the target device and status information from the target device to the initiator device;
the order of phase transitions of (i) and (ii) being independent of the configuration of the initiator and the target and independent of the type of information transfer.

120. A target device according to claim 119 wherein the data information comprises command information.

* * * * *